United States Patent
Nakayama et al.

(10) Patent No.: US 10,960,551 B2
(45) Date of Patent: Mar. 30, 2021

(54) SENSOR SYSTEM AND ROBOT HAND

(71) Applicant: Toyota Jidosha Kabushiki Kaisha, Toyota (JP)

(72) Inventors: Takahiro Nakayama, Nagoya (JP); Motohiro Fujiyoshi, Nagakute (JP); Yoshiyuki Hata, Nagakute (JP); Yoshiteru Omura, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/693,567

(22) Filed: Nov. 25, 2019

(65) Prior Publication Data
US 2020/0171672 A1  Jun. 4, 2020

(30) Foreign Application Priority Data
Nov. 30, 2018 (JP) .............................. JP2018-224446

(51) Int. Cl.
*B25J 13/08* (2006.01)
*B25J 9/16* (2006.01)

(52) U.S. Cl.
CPC ........... *B25J 13/082* (2013.01); *B25J 9/1612* (2013.01); *B25J 13/085* (2013.01)

(58) Field of Classification Search
CPC ...... B25J 13/082; B25J 9/1612; B25J 13/085; B25J 15/0253; G01L 5/226; G01L 5/228
USPC .................................................. 700/245, 258
See application file for complete search history.

(56) References Cited

U.S. PATENT DOCUMENTS

| | | | |
|---|---|---|---|
| 5,285,097 A * | 2/1994 | Hirai ...................... | H01L 27/20 257/417 |
| 8,651,543 B2 * | 2/2014 | Matsuoka ................. | B66C 1/42 294/192 |
| 9,134,189 B2 * | 9/2015 | Hata ........................ | G01L 1/144 |
| 9,724,825 B2 * | 8/2017 | Iwatake ................. | B25J 9/1687 |
| 2009/0044639 A1 * | 2/2009 | Maekawa ............... | B25J 13/082 73/862.474 |
| 2010/0156127 A1 * | 6/2010 | De Kervanoael .... | B25J 15/0253 294/106 |
| 2011/0005338 A1 * | 1/2011 | Okada .................... | G01L 5/0061 73/862.043 |
| 2012/0199921 A1 * | 8/2012 | Tanaka .................... | H01L 24/32 257/415 |

(Continued)

FOREIGN PATENT DOCUMENTS

JP  2011-158404 A  8/2011
JP  2014-115267 A  6/2014

*Primary Examiner* — Jaime Figueroa
(74) *Attorney, Agent, or Firm* — Dinsmore & Shohl LLP

(57) ABSTRACT

A sensor system according to the present disclosure includes a substrate, a force sensor, a calculation unit, and an output part. The substrate includes a reference plane and an inclined surface. The force sensor is provided on the inclined surface and outputs signals in three-axis directions that correspond to an orthogonal axis direction that is orthogonal to the inclined surface and two-axis directions that are parallel to the reference plane. The calculation unit calculates a pressing force in each coordinate axis direction of rectangular coordinates formed of an axis vertical to the reference plane and two axes parallel to the reference plane and moments around the respective coordinate axes of the rectangular coordinates. The output part outputs calculation results.

8 Claims, 11 Drawing Sheets

(56) References Cited

U.S. PATENT DOCUMENTS

| | | | | |
|---|---|---|---|---|
| 2013/0200644 A1* | 8/2013 | Shiomi | ................ | B25J 9/1612 |
| | | | | 294/207 |
| 2014/0109696 A1* | 4/2014 | Chen | ....................... | G01L 1/00 |
| | | | | 73/862.541 |
| 2014/0137670 A1* | 5/2014 | Hata | .................... | G01P 15/125 |
| | | | | 73/862.621 |
| 2014/0174239 A1* | 6/2014 | Nagata | .................. | B25J 9/1633 |
| | | | | 74/490.01 |
| 2014/0276944 A1* | 9/2014 | Farritor | ................ | A61B 34/30 |
| | | | | 606/130 |
| 2015/0177082 A1* | 6/2015 | Sawada | ................ | G01B 11/16 |
| | | | | 356/32 |
| 2017/0363464 A1* | 12/2017 | Shafer | ...................... | G01L 3/08 |
| 2018/0126551 A1* | 5/2018 | Amano | ................ | B25J 9/1612 |
| 2018/0141217 A1* | 5/2018 | Kamiya | ................ | B25J 13/085 |
| 2018/0356301 A1* | 12/2018 | Tomita | ................ | B25J 13/084 |
| 2019/0001510 A1* | 1/2019 | Nagamatsu | ............ | B25J 19/028 |
| 2019/0022864 A1* | 1/2019 | Shimodaira | ............ | B25J 13/085 |
| 2019/0064927 A1* | 2/2019 | Tachi | ................ | G06F 3/03543 |
| 2019/0329403 A1* | 10/2019 | Ueda | ................... | B25J 15/0052 |

* cited by examiner

SENSOR SYSTEM AND ROBOT HAND

CROSS REFERENCE TO RELATED APPLICATIONS

This application is based upon and claims the benefit of priority from Japanese patent application No. 2018-224446, filed on Nov. 30, 2018, the disclosure of which is incorporated herein in its entirety by reference.

BACKGROUND

The present disclosure relates to a sensor system and a robot hand.

Developments of force sensors that detect pressures in a plurality of axial directions and moments around a plurality of axes have been conducted. Further, proposals for forming a sensor system by using a plurality of force sensors and applying this sensor system to a robot hand or the like have been made.

For example, Japanese Unexamined Patent Application Publication No. 2011-158404 discloses a physical quantity deriving device or the like capable of deriving information on a physical quantity acting in a horizontal direction with respect to a contact of a force sensor.

SUMMARY

Incidentally, it is expected that a force sensor that detects pressures in a plurality of axial directions or moments around a plurality of axes will be used for a tactile sensor of a robot hand or the like. However, when, for example, a strain gauge is used, as disclosed in Japanese Unexamined Patent Application Publication No. 2011-158404, a strain body needs to be made large in order to increase the resolution, which causes the size of the sensor unit itself to be increased.

The present disclosure has been made in order to solve the aforementioned problem, and provides a six-axis sensor system and the like that can achieve downsizing and thinning and that corresponds to a desired area.

A sensor system according to the present disclosure includes a substrate, a force sensor, a calculation unit, and an output part. The substrate includes a reference plane and an inclined surface that is inclined at a predetermined angle with respect to the reference plane. The force sensor is provided on the inclined surface and outputs signals in three-axis directions that correspond to an orthogonal axis direction that is orthogonal to the inclined surface and two-axis directions that are parallel to the reference plane in accordance with an external force from an object received by a power receiving part. The calculation unit calculates, based on the signals that the force sensor outputs, a pressing force in each coordinate axis direction of rectangular coordinates formed of an axis vertical to the reference plane and two axes parallel to the reference plane and moments around the respective coordinate axes of the rectangular coordinates. The output part outputs calculation results, which are results of the calculation.

According to the aforementioned structure, the sensor system is able to detect pressing forces in a pulling direction and a compression direction in the axial direction that is orthogonal to the reference plane from the signal output from the force sensor provided on the inclined surface.

In the above sensor system, the plurality of force sensors may be capacitive type sensors. Accordingly, in some embodiments, the sensor system may perform calculation of a pressing force or a moment.

Further, in the above sensor system, the reference plane may include a plurality of inclined surfaces having lines of intersection different from one another with respect to the reference plane, and the force sensor may be arranged in each of the plurality of inclined surfaces. Accordingly, the sensor system is able to detect moments around a plurality of different axes parallel to the reference plane.

Furthermore, in the above sensor system, the inclined surface that the reference plane includes may be a side surface of a convex part having a truncated pyramid shape, the reference plane serving as a bottom surface. Accordingly, the sensor system is able to detect moments around a plurality of different axes parallel to the reference plane.

Further, in the above sensor system, the inclined surface that the reference plane includes may be a side surface of a convex part having a quadrangular pyramid frustum shape, the reference plane serving as a bottom surface. Accordingly, the sensor system is able to detect moments around a plurality of different axes parallel to the reference plane.

Further, in the above sensor system, the inclined surface that the reference plane includes may be a side surface of a concave part having a reverse truncated pyramid shape, the reference plane serving as a top surface. Accordingly, the sensor system is able to detect moments around a plurality of different axes parallel to the reference plane.

Further, in some embodiments of the above sensor system, the above calculation unit extracts a component in a direction that is vertical to the reference plane from a pressing force in a direction that is parallel to the inclined surface of the output of the force sensor, and calculates the moment from the extracted component and a rotation center of the substrate. Accordingly, in some embodiments the sensor system is able to detect moments around a plurality of different axes parallel to the reference plane.

A robot hand according to one aspect of the present disclosure includes the above sensor system, a plurality of gripping parts that grip an object; and a driving part that causes the plurality of gripping parts to approach in such a way that they are opposed to each other, in which the gripping part includes the substrate and a plurality of force sensors of the sensor system. Accordingly, the robot hand is able to detect a pressing force in the orthogonal axis direction and a moment around an orthogonal axis.

According to the present disclosure, it is possible to provide a six-axis sensor system and the like that can achieve downsizing and thinning and that corresponds to a desired area.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Hereinafter, the present disclosure will be explained with reference to the embodiments. However, the disclosure set forth in the claims is not limited to the following embodiments. Further, not all the structures explained in the embodiments may be necessary as means for solving the problem.

First Embodiment

Figure 1:
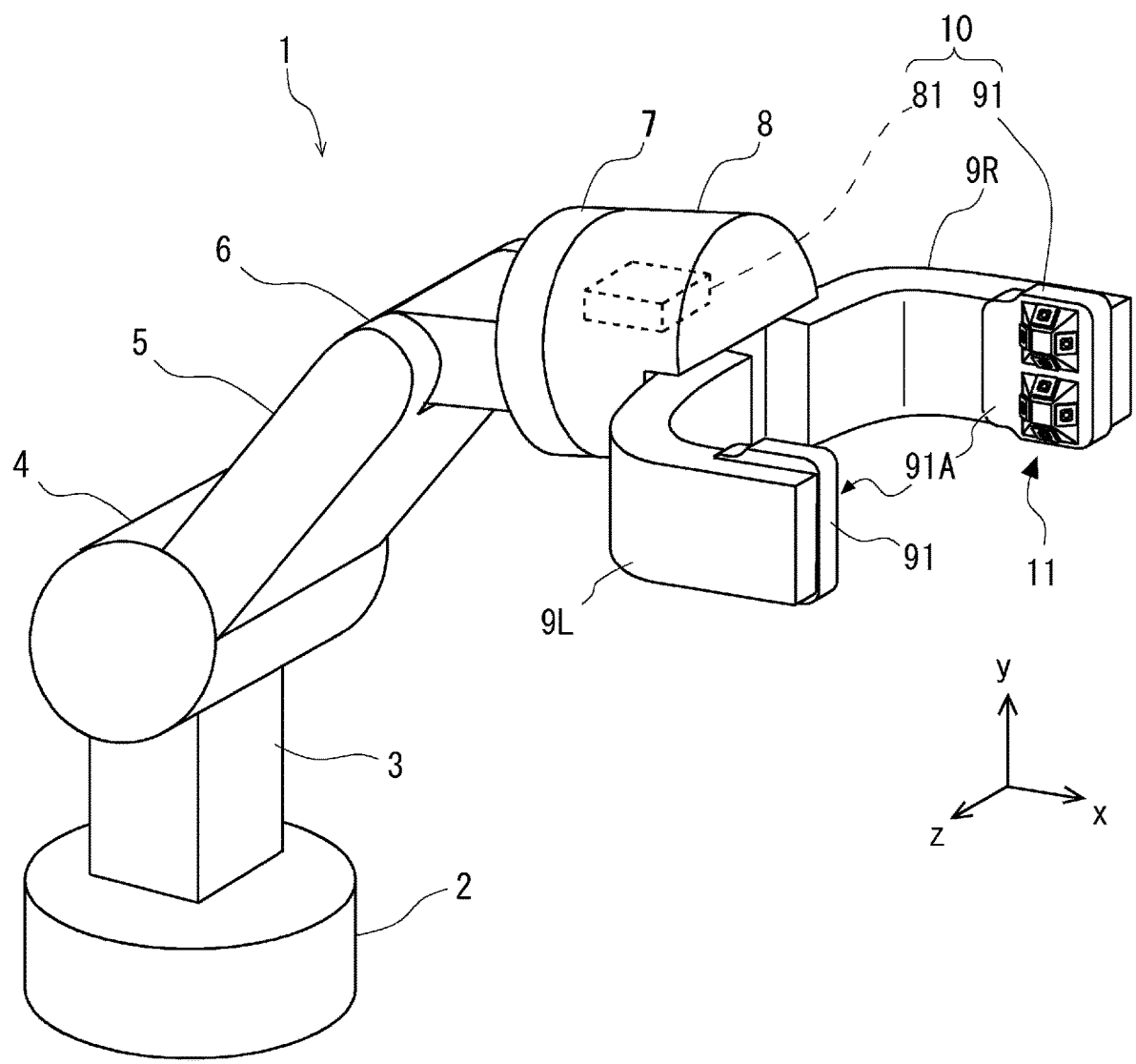
FIG. 1 is an external perspective view of a robot hand according to a first embodiment.

FIG. 1 is an external perspective view of a robot hand 1 according to this embodiment. For the sake of convenience to explain the positional relation of components, a right-handed rectangular coordinate system is added to FIG. 1. Further, when the rectangular coordinate system is added in FIG. 2 and the following drawings, the x-axis direction in FIG. 1, and the x-axis, the y-axis, and the z-axis directions of this rectangular coordinate system match each other.

The robot hand 1 is a device that grips an object and moves the gripped object to a predetermined position. The robot hand 1 mainly includes a base 2, a first arm 3, a first joint 4, a second arm 5, a second joint 6, a third arm 7, a third joint 8, a first finger part 9R, and a second finger part 9L.

The base 2, which is fixed to a desired position, is a support stand that supports the whole robot hand 1. The base 2 has a flat cylinder shape, and has a circular bottom surface placed on a desired placement surface, and the first arm 3 is connected to the top surface of the base 2. The first arm 3, which is a rod-like member that is extended upward from the base 2, has an upper end that is connected to the first joint 4.

The first joint 4 is connected to each of the first arm 3 and the second arm 5, and relatively rotate the first arm 3 and the second arm 5 in a predetermined range about the rotating axis that is parallel to the XZ plane. The first joint 4 includes a motor for relatively rotating the first arm 3 and the second arm 5. The second arm 5 is a rod-like member having one end connected to the first joint 4. The second arm 5 is extended in the direction that is orthogonal to the rotating axis of the first joint 4 from the first joint 4 and has another end connected to the second joint 6.

The second joint 6 is connected to each of the second arm 5 and the third arm 7, and relatively rotates the second arm 5 and the third arm 7 in a predetermined range about the rotating axis that is parallel to the XZ plane. The second joint 6 includes a motor for relatively rotating the second arm 5 and the third arm 7. The third arm 7 is a rod-like member having one end connected to the second joint 6. The third arm 7 is extended in the direction that is orthogonal to the rotating axis of the second joint 6 from the second joint 6 and has another end connected to the third joint 8.

The third joint 8 is connected to the third arm 7, and is rotated about the axis that is orthogonal to the rotating axis of the second joint 6. The third joint 8 includes a motor for causing it to rotate about the axis that is orthogonal to the rotating axis of the second joint 6. Further, the third joint 8 is connected to the first finger part 9R and the second finger part 9L on a side opposite to the side on which it is connected to the third arm 7. The third joint 8 includes a driving part for causing the first finger part 9R and the second finger part 9L to come close to each other or move away from each other.

The third joint 8 further includes a signal processing unit 81, which is a substrate including a calculation apparatus such as a Central Processing Unit (CPU). The signal processing unit 81 is connected to a plurality of force sensors 11. The signal processing unit 81 acquires signals from the force sensors 11, processes the acquired signals, and outputs the results of the processing.

The robot hand 1 allows the first finger part 9R and the second finger part 9L to move away from and come close to each other so that the first finger part 9R and the second finger part 9L can grip the object. The first finger part 9R and the second finger part 9L are substantially L-shaped members each having one end connected to the third joint 8, are extended in a direction in which they move away from each other, are bent at right angles in the same direction at the intermediate part thereof, and are arranged in such a way that the other ends thereof are opposed to each other. A gripping part 91 is provided in each of the tip end parts of the first finger part 9R and the second finger part 9L in such a way that the gripping parts 91 are opposed to each other. The plurality of force sensors 11 are provided in reference planes 91A where the gripping parts 91 included in the first finger part 9R and the second finger part 9L are opposed to each other. The force sensors 11 are connected to the signal processing unit 81, and supply a signal that is output in accordance with a received external force to the signal processing unit 81.

The robot hand 1 shown in FIG. 1 includes a sensor system 10. The sensor system 10 is a system that detects a pressing force in the orthogonal axis direction that the robot hand 1 receives from the gripped object and a moment around the orthogonal axis, and outputs the pressing force and the moment that have been detected. The sensor system 10 is composed of the plurality of force sensors 11 included in the gripping part 91 described above, and a function included in the signal processing unit 81 that processes a signal output from the force sensor 11. The details of the configuration of the sensor system 10 will be described later.

Figure 2:
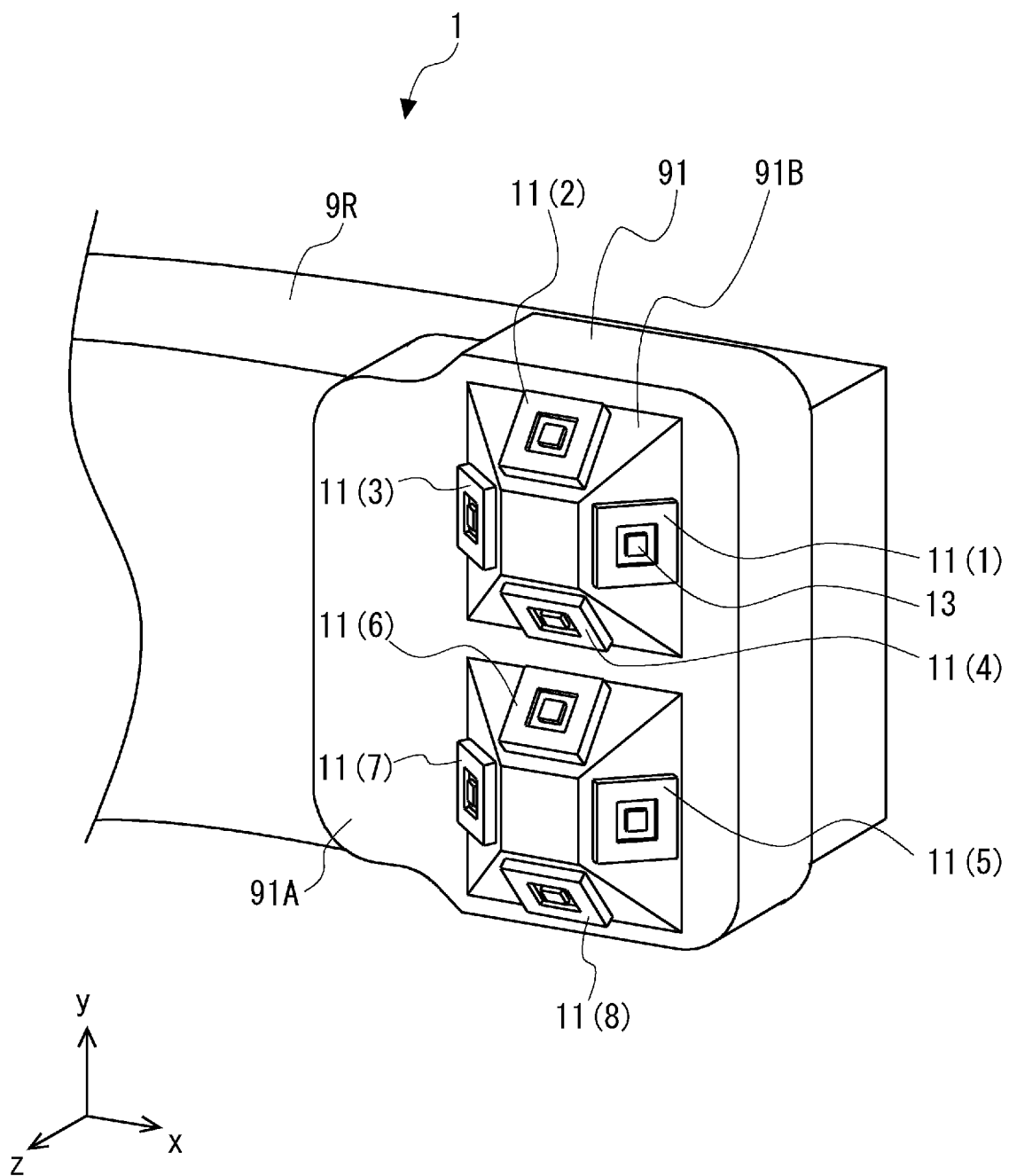
FIG. 2 is a diagram showing a structure of a gripping part.

Referring next to FIG. 2, details of the gripping part 91 will be explained. FIG. 2 is a diagram showing a configuration of the gripping part 91. The gripping part 91 is a substrate in which a structure that abuts the object when it grips the object is arranged. The gripping part 91 is formed of a plate-like member having a substantially rectangular shape, and includes the reference plane 91A on the side that abuts the object. The reference plane 91A shown in FIG. 2 shows a state in which it is stopped while keeping in parallel to the xy plane.

Two convex parts having a quadrangular pyramid frustum shape are formed on the reference plane 91A along the y axis. Further, the two quadrangular pyramid frusta have the same shape. The respective sides formed by the rectangle of the bottom surface part of the quadrangular pyramid frustum are each along the x axis or the y axis. Inclined surfaces 91B, which are side surfaces of the quadrangular pyramid frustum, are formed in such a way that they each form a predetermined angle with respect to the reference plane 91A.

The force sensor 11 is arranged on each of the inclined surfaces 91B. That is, the force sensors 11 are arranged on the respective inclined surfaces included in the two convex parts having a quadrangular pyramid frustum shape. Therefore, the gripping part 91 includes eight force sensors 11. That is, the reference plane 91A includes the plurality of inclined surfaces 91B having lines of intersection different from each other with reference to the reference plane 91A, and the force sensor 11 is arranged in each of the plurality of inclined surfaces 91B.

In the example shown in FIG. 2, the eight force sensors are shown with the symbols of the force sensor 11(1) to the force sensor 11(8). It is the force sensor 11(1) that is arranged on the inclined surface 91B on the x-axis positive side of the quadrangular pyramid frustum on the y-axis positive side in FIG. 2, and the force sensors 11(2), 11(3), and 11(4) are arranged in a counterclockwise direction. In the quadrangular pyramid frustum on the y-axis negative side in FIG. 2 as well, it is the force sensor 11(5) that is arranged on the inclined surface 91B on the x-axis positive side, and the force sensors 11(6), 11(7), and 11(8) are arranged in a counterclockwise direction.

The force sensors 11(1)-11(4) are arranged on the respective side surfaces of one quadrangular pyramid frustum. Therefore, the force sensors 11(1)-11(4) are arranged on planes that form preset angles with respect to the reference plane 91A and that are not parallel to one another. The force sensor 11(1) and the force sensor 11(5) are arranged to be parallel to each other. In a similar way, the force sensor 11(2) and the force sensor 11(6), the force sensor 11(3) and the force sensor 11(7), and the force sensor 11(4) and the force sensor 11(8) are arranged to be parallel to each other.

The force sensor 11, which is a sensor that receives an external force, is a MEMS sensor formed using the technique of Micro Electro Mechanical Systems (MEMS). The force sensor 11 has a flat prismatic shape, and the abutting part 13 is provided on the top surface thereof. Further, the force sensor 11 is configured to output a signal in accordance with an external force received by the abutting part 13 and supply the output signal to the signal processing unit 81. Therefore, the robot hand 1 detects the pressing force or the moment received from the object by the abutting parts 13 of the force sensors 11(1)-11(8) provided in the gripping part 91 receiving the external force.

Figure 3:
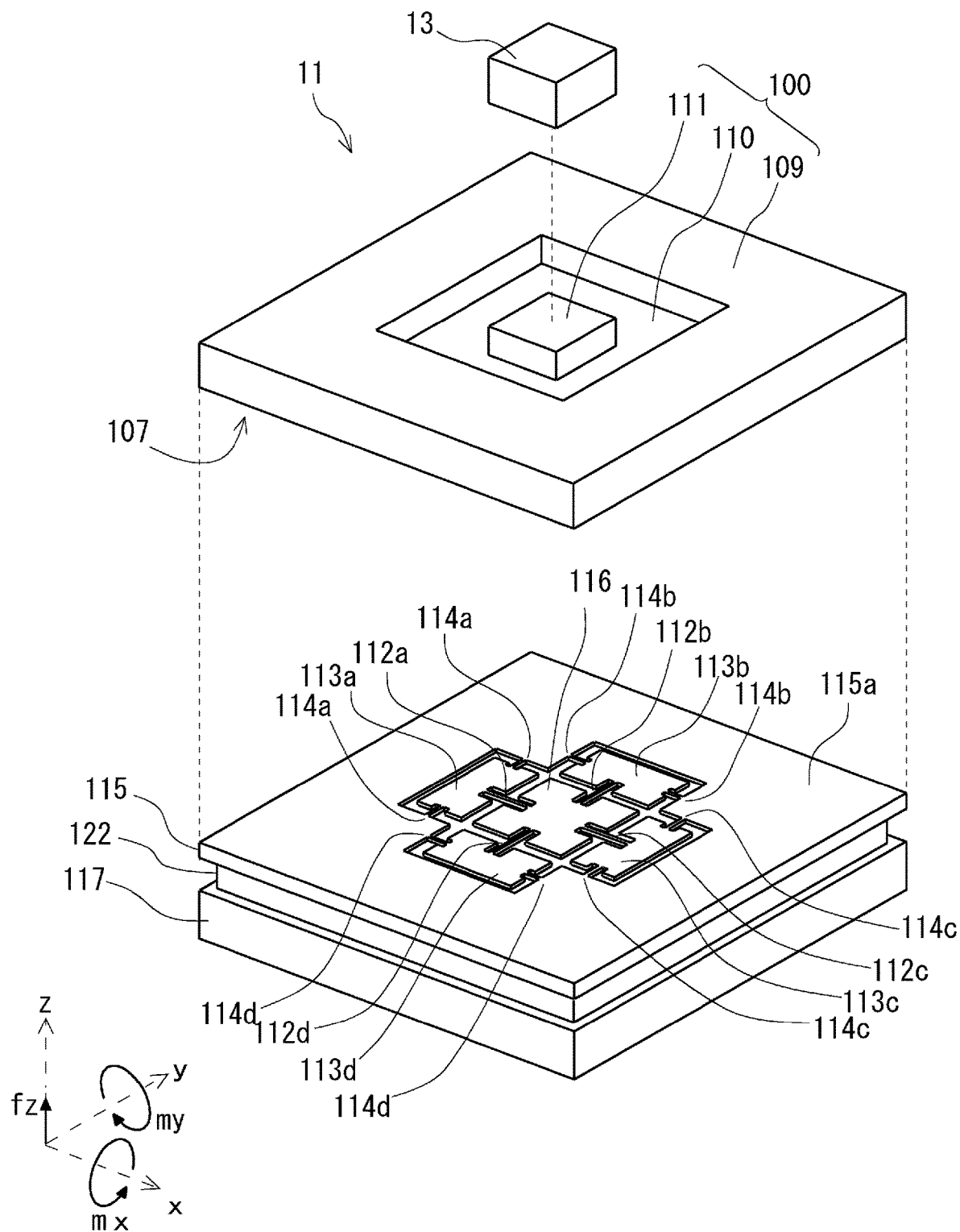
FIG. 3 is an exploded perspective view of a force sensor when it is seen from a z-axis positive side.
Figure 4:
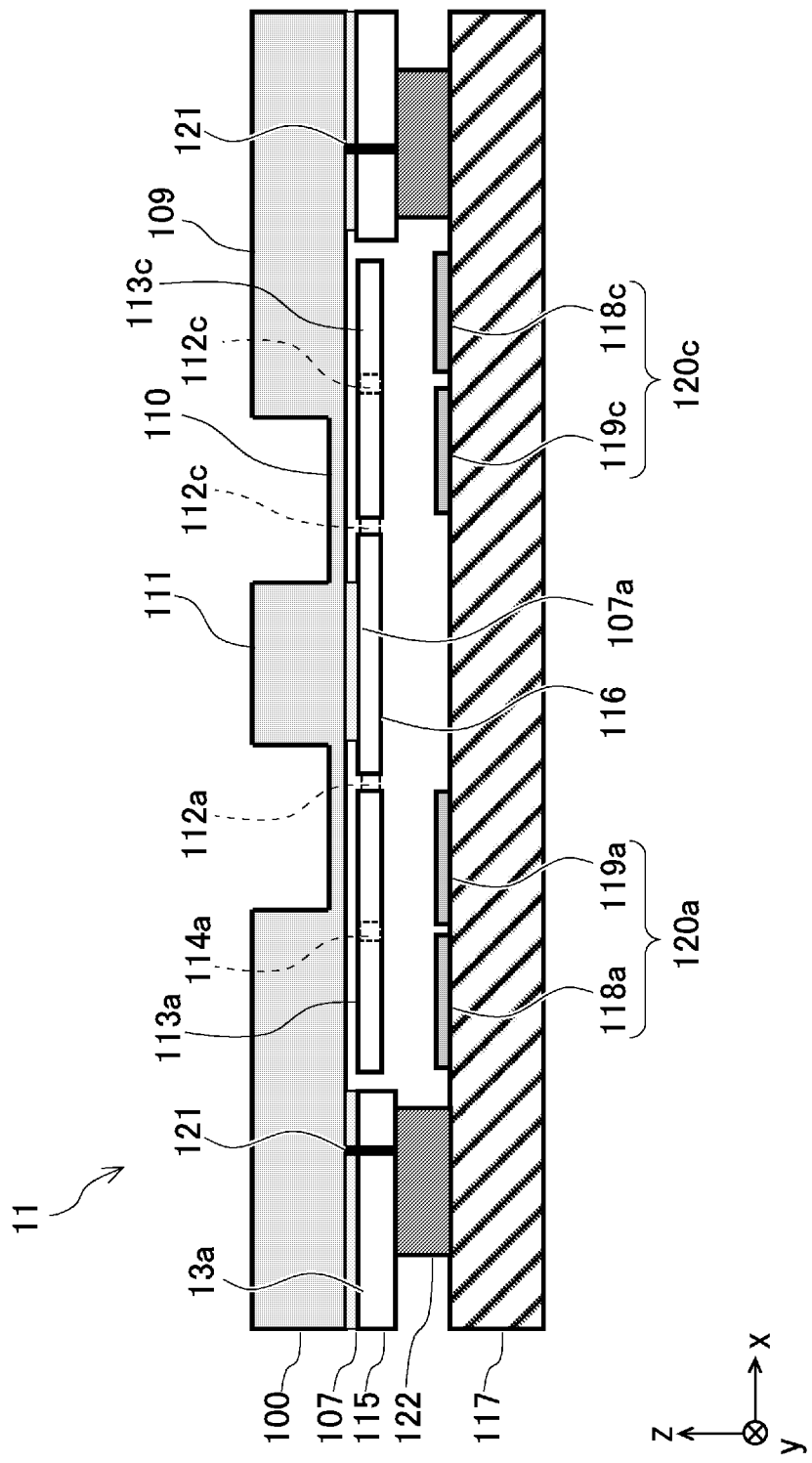
FIG. 4 is a cross-sectional view of the force sensor when it is seen from an xz plane.

Referring next to FIGS. 3-6, the force sensor 11 will be explained. FIG. 3 is an exploded perspective view of the force sensor 11 when it is seen from the z-axis positive side. FIG. 4 is a cross-sectional view showing the force sensor from the xz plane. The force sensor 11 has a form of a square column shape having a surface that is orthogonal to the z axis as a principal surface, and the principal surface has a substantially square shape. The force sensor 11 is a capacitive type sensor that outputs pressing forces in the three-axis direction. That is, the force sensor 11 includes a plurality of electrodes. The configuration of the electrodes will be described later. The force sensor 11 mainly includes a first silicon layer 100, a second silicon layer 115, a bonding part 122, and a sealing substrate 117.

The first silicon layer 100 is also a supporting substrate that supports a seesaw part that will be described below. Further, the first silicon layer 100 is a silicon layer having conductivity. A diaphragm 110 is formed in the back surface center part of the first silicon layer 100, and further a protruded power receiving part 111 is formed in the center part inside the diaphragm 110. The diaphragm 110 and the power receiving part 111 have substantially square shapes in the top view, similar to an outline of the first silicon layer 100. The diaphragm 110 is a thin part that has a thinner film thickness than a peripheral part 109 of the first silicon layer 100 is, has flexibility, and is elastically deformed according to application of a force to the power receiving part 111. The first silicon layer 100 has a predetermined thickness, and the film thickness of the center part excluding the power receiving part 111 is made thinner from the z-axis positive side by etching, whereby the diaphragm 110 is formed. The power receiving part 111 may have a thickness the same as that of the peripheral part 109 or may have a thickness larger than that of the peripheral part 109. The power receiving part 111 is configured to couple the abutting part 13 to the top surface of a first power receiving part and to receive an external force via the abutting part 13.

A force receiving piece 116 is formed in a center part of the second silicon layer 115 on the bottom surface side of the first silicon layer 100, and four seesaw parts 113a-113d are formed around the force receiving piece 116. The seesaw parts 113a and 113c are arranged on the respective sides of the force receiving piece 116 in the x-axis direction, and the seesaw parts 113b and 113d are arranged on the respective sides of the force receiving piece 116 in the y-axis direction. The force receiving piece 116 and the seesaw parts 113a-113d are coupled to one another by hinge beams 112a-12d (any one of them is also referred to as a hinge beam 112).

The second silicon layer 115 has a predetermined film thickness, and the force receiving piece 116, the seesaw parts 113a-113d, the hinge beams 112a-112d and the like are formed by etching. The second silicon layer 115 is a silicon layer having conductivity, similar to the first silicon layer 100, and the whole parts of the force receiving piece 116, the seesaw parts 113a-113d, the hinge beams 112a-112d and the like are conducted, and are electrically connected to one another.

An insulating layer 107 is provided between the first silicon layer 100 and the second silicon layer 115. The insulating layer 107, which is processed by sacrificial etching, bonds a peripheral part 115a of the second silicon layer 115 and the first silicon layer 100. Further, the insulating layer 107 bonds the power receiving part 111 and the force receiving piece 116.

Torsion beams 114a are extended from each of the y-axis positive side and the y-axis negative side of the seesaw part 113a in such a way that the torsion beams 114a are parallel to the y axis and coaxial with each other. Torsion beams 114b are extended from each of the x-axis positive side and the x-axis negative side of the seesaw part 113b in such a way that the torsion beams 114b are parallel to the x axis and coaxial with each other. Torsion beams 114c are extended from each of the y-axis positive side and the y-axis negative side of the seesaw part 113c in such a way that the torsion beams 114c are parallel to the y axis and coaxial with each other. Torsion beams 114d are extended from each of the x-axis positive side and the x-axis negative side of the seesaw part 113d in such a way that the torsion beams 114d are parallel to the x axis and coaxial with each other. The seesaw parts 113a-113d are coupled to the peripheral part 115a by the torsion beams 114a-14d, respectively. The torsion beams 114a-114d have a beam structure that these beams can be twisted. Therefore, the seesaw parts 113a-113d are rotationally supported, with the torsion beams 114a-114d by which they are supported being set as an axis. The torsion beams 114a-114d may be referred to as rotational axes of the seesaw parts 113a-113d.

In the second silicon layer 115, the peripheral part 115a is formed around the seesaw parts 113a-113d. The peripheral part 115a is connected to the torsion beams 114a-14d, thereby supporting the seesaw part 113.

In the x-axis negative side of the force receiving piece 116, the center parts of the respective sides of the force receiving piece 116 and the seesaw part 113a opposed to each other are coupled to each other by the hinge beam 112a. In the y-axis positive side of the force receiving piece 116, the center parts of the respective sides of the force receiving piece 116 and the seesaw part 113b opposed to each other are coupled to each other by the hinge beam 112b. In the x-axis positive side of the force receiving piece 116, the center parts of the respective sides of the force receiving piece 116 and the seesaw part 113c opposed to each other are coupled to each other by the hinge beam 112c. In the y-axis negative side of the force receiving piece 116, the center parts of the respective sides of the force receiving piece 116 and the seesaw part 113d opposed to each other are coupled to each other by the hinge beam 112d. The hinge beam 112a and the hinge beam 112c are provided so as to be parallel to the x axis and coaxial with each other. The hinge beam 112b and the hinge beam 112d are provided to be parallel to the y axis and coaxial with each other. The hinge beams 112a-112d have a beam structure that can be bent and twisted, and are extended vertically to a rotational axis of the torsion beams 114a-114d.

According to the aforementioned structure, the force receiving piece 116 is rotationally supported, with the hinge beams 112a and 112c being set as an axis. Further, the force receiving piece 116 is rotationally supported, with the hinge beams 112b and 112d being set as an axis. Further, the force receiving piece 116 is supported in such a way that it can be displaced in parallel to the z-axis direction. In other words, the force receiving piece 116 follows in the z-axis direction, about the x axis, and about the y axis in accordance with the external force received by the power receiving part 111. Furthermore, the power receiving part 111 transmits the external force to the seesaw parts 113a-113d. When the seesaw parts 113a-113d are displaced in the rotational direction due to the transmitted force, the force sensor 11 outputs the pressing forces in the three-axis direction received by the force sensor 11.

A penetrating electrode 121 is formed in the peripheral part 115a on the outside of the seesaw parts 113a-113d of the second silicon layer 115. The penetrating electrode 121 penetrates through the second silicon layer 115 and the insulating layer 107, and electrically connects the first silicon layer 100, and the second silicon layer 115 and the bonding part 122.

The bonding part 122 seals and bonds the second silicon layer 115 and the sealing substrate 117 so as to surround the seesaw part 113 and the force receiving piece 116 in the peripheral part of the force sensor 11. The bonding part 122, which is a metal diffusion bond member having conductivity, is formed of, for example, Cu—Sn (copper-tin) alloy or the like.

The sealing substrate 117 is a substrate that seals the whole movable part including the seesaw parts 113a-113d and the force receiving piece 116. The sealing substrate 117 is, for example, a silicon substrate, a Low Temperature Co-fired Ceramic (LTCC) substrate, or a Large Scale Integration (LSI). For example, a via (not shown) through which an electrode potential on the top surface side is pulled out to the bottom surface side is arranged in the sealing substrate 117, an external terminal (not shown) connected to this via is arranged at the back surface (bottom surface side) of the sealing substrate 117, and an external detection circuit and the like are connected to the external terminal. In addition, if needed, a circuit, such as a detection circuit, and wiring are provided inside the sealing substrate 117. The sealing substrate 117, in some embodiments, is formed of an LSI. Accordingly, since a processing circuit can be arranged at a part near the sensor structure, it is unlikely to be affected by noise.

Fixed electrode pairs 120a-120d are formed on the top surface side of the sealing substrate 117. The fixed electrode pair 120a includes fixed electrodes 18a and 119a. In a similar way, the fixed electrode pair 120b includes fixed electrodes 118b and 119b, the fixed electrode pair 120c includes fixed electrodes 118c and 119c, and the fixed electrode pair 120d includes fixed electrodes 118d and 119d.

The fixed electrodes 118a-118d and 119a-119d, which are conductive films having conductivity, such as metal, are patterned and formed on the sealing substrate 117. The fixed electrodes 118a-18d and 119a-119d are respectively arranged at positions that correspond to the seesaw parts 113a-113d, and form a capacitive element together with the seesaw parts 113a-113d. The fixed electrodes 118a-118d are arranged on the outside of the rotational axis (torsion beams 114a-114d) of the seesaw parts 113a-113d and the fixed electrodes 119a-119d are arranged on the inside thereof. For example, electric capacities of these capacitive elements can be detected by the external detection circuit or the like through the via (not shown) arranged in the sealing substrate 117, or by the LSI included in the sealing substrate 117.

Figure 5A:
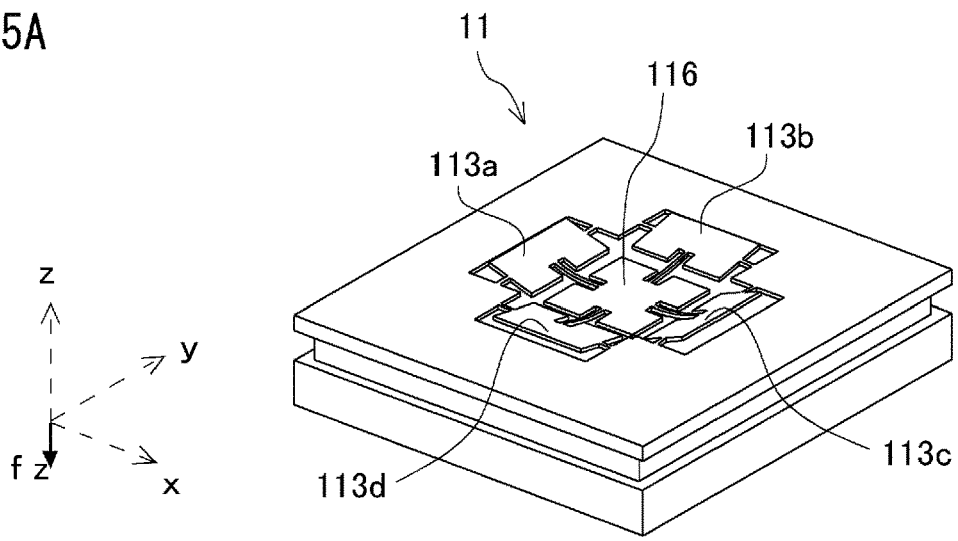
FIG. 5A is a perspective view for explaining a movement of a movable part of the force sensor.
Figure 5B:
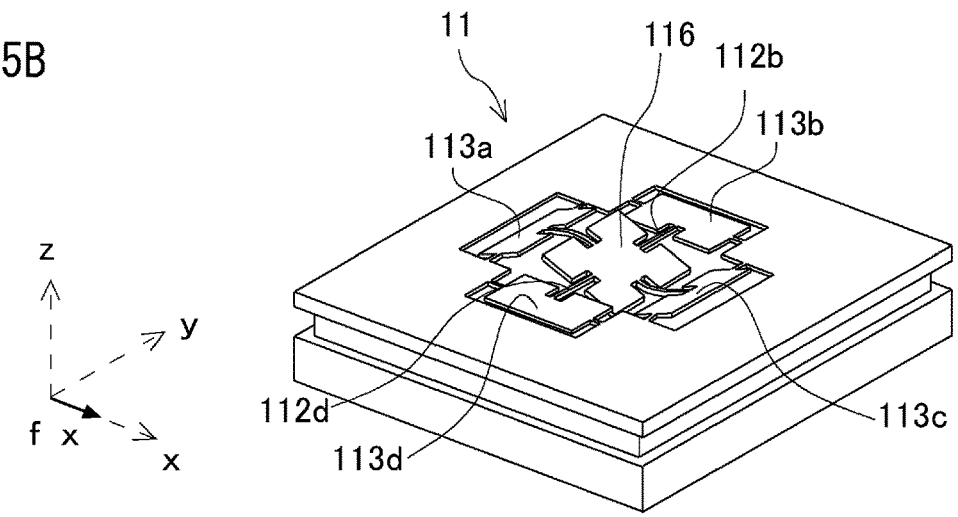
FIG. 5B is a perspective view for explaining a movement of the movable part of the force sensor.
Figure 5C:
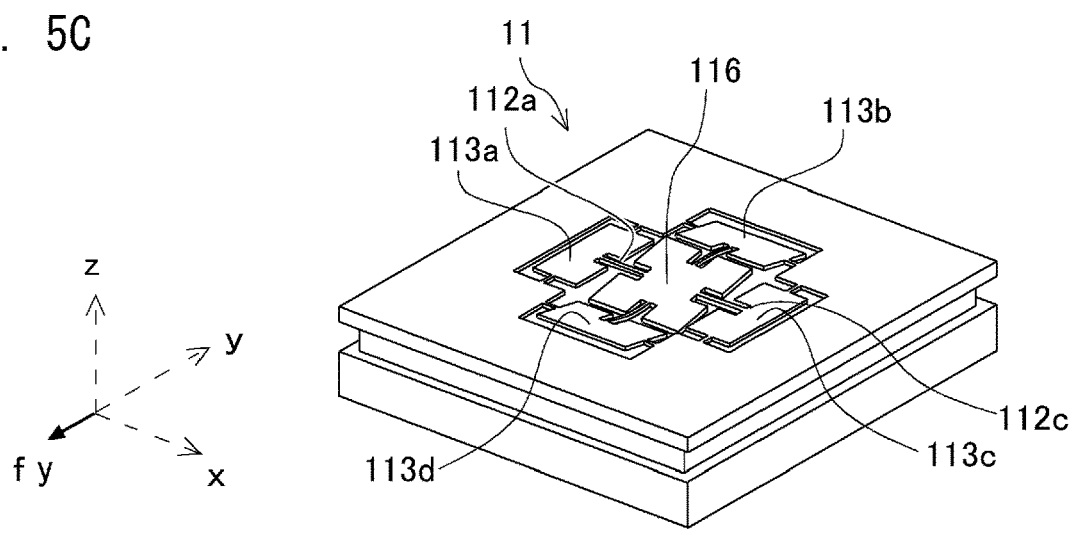
FIG. 5C is a perspective view for explaining a movement of the movable part of the force sensor.

With reference next to FIGS. 5A-5C, details of movements of the movable part of the force sensor 11 will be explained. FIGS. 5A-5C are perspective views for explaining movements of the force sensor. FIG. 5A is a diagram when a pressing force fz in the z-axis negative direction is applied to the power receiving part 111. FIG. 5B is a diagram when a pressing force fx in the x-axis positive direction is applied to the power receiving part 111. FIG. 5C is a diagram when a pressing force fy in the y-axis negative direction is applied to the power receiving part 111. In FIGS. 5A-5C, for the sake of convenience of the description, the first silicon layer 100 is omitted.

As shown in FIG. 5A, when the pressing force fz in the z-axis negative direction is applied to the power receiving part 111, the power receiving part 111 and the force receiving piece 116 bonded to the power receiving part 111 are displaced in the z-axis negative direction while maintaining the state in which they are parallel to the xy plane. Accordingly, the seesaw part 113a is rotated in such a way that the x-axis positive side is inclined in the z-axis negative side. In a similar way, the seesaw part 113b is rotated in such a way that the y-axis negative side is inclined in the z-axis negative side, the seesaw part 113c is rotated in such a way that the x-axis negative side is inclined in the z-axis negative side, and the seesaw part 113d is rotated in such a way that the y-axis positive side is inclined in the z-axis negative side.

As shown in FIG. 5B, when the pressing force fx in the x-axis positive direction has been applied to the power receiving part 111, the first power receiving part 111 is rotated about the y axis and the force receiving piece 116 is rotated. Further, the seesaw part 113b and the seesaw part 113d are not rotated, and each of the hinge beam 112b and the hinge beam 112d is twisted, which serve as a supporting point of the rotational movement of the power receiving part 111. On the other hand, the seesaw part 113a and the seesaw part 113c are rotated in the direction opposite to the direction in which the power receiving part 111 moves in accordance with the movement of the power receiving part 111. In FIG.

5B, the power receiving part 111 is rotated in such a way that the x-axis positive side is inclined in the z-axis negative side. Therefore, the seesaw part 113a and the seesaw part 113c are rotated in such a way that the x-axis negative side is inclined in the z-axis negative side.

As shown in FIG. 5C, when the pressing force fy in the y-axis negative direction is applied to the power receiving part 111, the first power receiving part 111 is rotated about the x axis and further rotates the force receiving piece 116. Further, the seesaw part 113a and the seesaw part 113c are not rotated, and the hinge beam 112a and the hinge beam 112c are twisted, which serve as a supporting point of the rotational movement of the power receiving part 111. On the other hand, along with the movement of the power receiving part 111, the seesaw part 113b and the seesaw part 113d are rotated in the direction opposite to the direction in which the power receiving part 111 moves. In FIG. 5C, the power receiving part 111 is rotated in such a way that the y-axis negative side is inclined in the z-axis negative side. Therefore, the seesaw part 113b and the seesaw part 113d are rotated in such a way that the y-axis positive side is inclined in the z-axis negative side.

Figure 6:
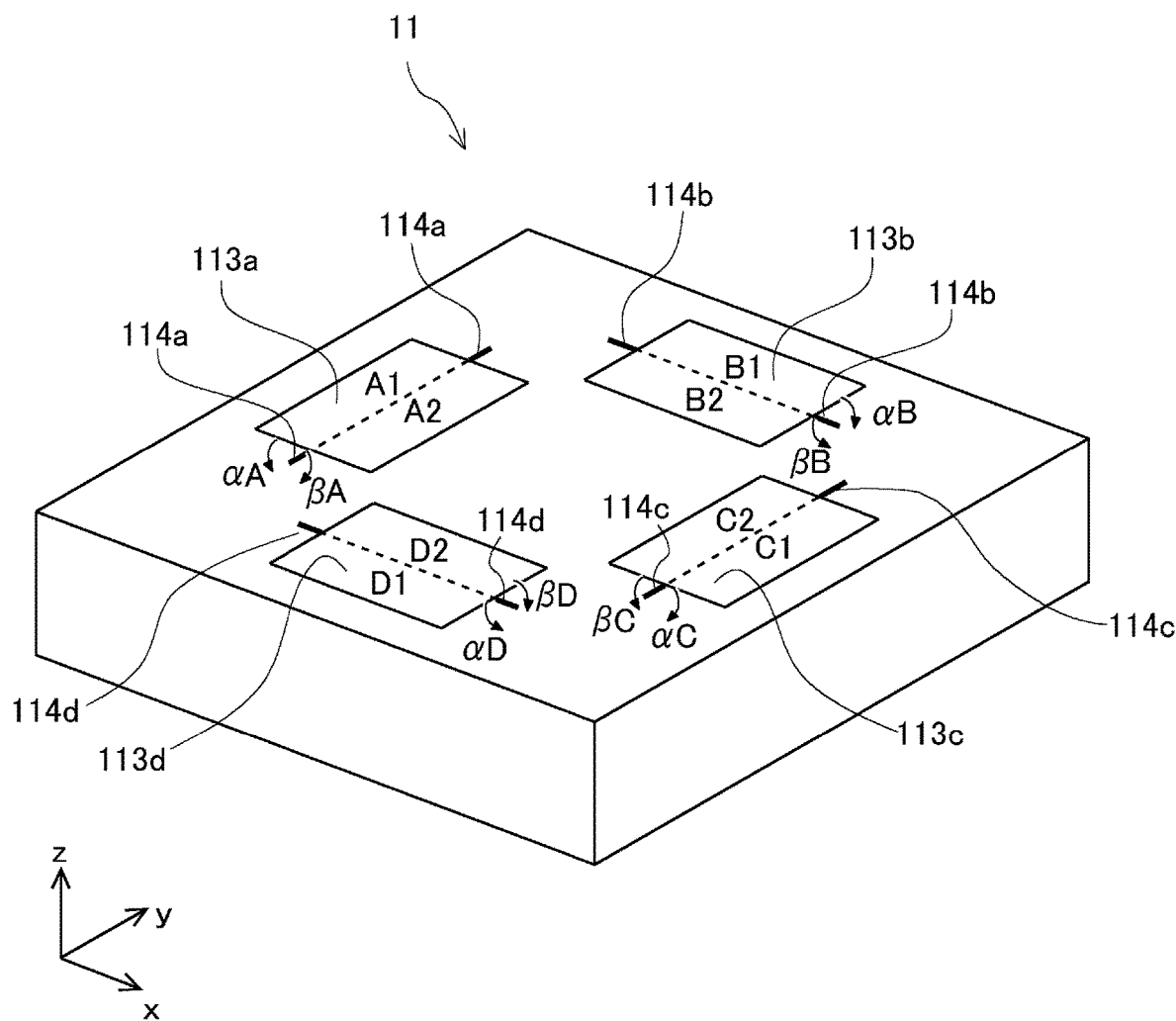
FIG. 6 is a perspective view for explaining a principle that the capacity of the force sensor is changed.

Referring next to FIG. 6, outputs of the force sensors 11 will be explained. FIG. 6 is a perspective view for explaining the principle that the capacity of a force sensor is changed. FIG. 6 shows an arrangement image of the seesaw parts 113a-113d and the torsion beams 114a-114d in the force sensors 11.

First, in the following, a capacity change of an electrode that corresponds to the seesaw part 113a will be explained. The seesaw parts 113a-113d included in the force sensors 11 change electrostatic capacities based on the principle similar to that of the seesaw part 113a explained below.

In the seesaw part 113a, the torsion beam 114a, which is a rotational axis, is extended in the y-axis direction. Therefore, the seesaw part 113a is rotated in an αA direction or a βA direction about the torsion beam 114a in accordance with the forces in the x-axis direction and the z-axis direction. The capacity outside the rotational axis of the seesaw part 113a is denoted by a capacity A1 and the capacity inside the rotational axis thereof is denoted by a capacity A2. When the seesaw part 113a is rotated in the αA direction, the capacity A2 increases while the capacity A1 decreases. Further, when the seesaw part 113a is rotated in the βA direction, the capacity A2 decreases while the capacity A1 increases. That is, the force sensor 11 includes each of the electrode that detects the capacity A1 outside the rotational axis of the seesaw part 113a, and the electrode that detects the capacity A2 inside the rotational axis of the seesaw part 113a. Accordingly, the force sensor 11 detects the differential between the capacity A1 and the capacity A2 in accordance with the rotational displacement of the seesaw part 113a.

The seesaw part 113a is rotated in the αA direction when a force in the z axis positive direction is applied to the power receiving part 111 and is rotated in the βA direction when a force in the z-axis negative direction is applied to the power receiving part 111. The seesaw part 113a is rotated in the βA direction when a force in the x-axis negative direction is applied to the power receiving part 111 and is rotated in the αA direction when a force in the x-axis positive direction is applied to the power receiving part 111. The seesaw part 113a is not displaced with respect to a force in the y-axis direction.

Based on the principles similar to those described above, the seesaw part 113b is rotated in an αB direction and a βB direction, with the torsion beam 114b that is extended in the x-axis direction being set as a rotational axis. In accordance therewith, a capacity B1 and a capacity B2 that correspond to the seesaw part 113b are changed. In a similar way, the seesaw part 113c is rotated in an αC direction and a βC direction, with the torsion beam 114c that is extended in the y-axis direction being set as a rotational axis. In accordance therewith, a capacity C1 and a capacity C2 that correspond to the seesaw part 113c are changed. The seesaw part 113d is rotated in an αD direction and a βD direction, with the torsion beam 114d that is extended in the x-axis direction being set as a rotational axis. In accordance therewith, a capacity D1 and a capacity D2 that correspond to the seesaw part 113d are changed. In this way, the force sensor 11 detects the differential between the electrodes included in the seesaw parts 113a-113d. The differential between the electrodes detected by the force sensor 11 is converted into pressing forces in the three-axis direction by the following Expression (1).

$$\begin{pmatrix} fx \\ fy \\ fz \\ 0 \end{pmatrix} = \frac{1}{4} \cdot \begin{pmatrix} 2 & 0 & -2 & 0 \\ 0 & 2 & 0 & -2 \\ 1 & 1 & 1 & 1 \\ 0 & 0 & 0 & 0 \end{pmatrix} \cdot \begin{pmatrix} A1 - A2 \\ B1 - B2 \\ C1 - C2 \\ D1 - D2 \end{pmatrix} \quad (1)$$

The symbol fx represents the pressing force in the x-axis direction received by the power receiving part 111, fy represents the pressing force in the y-axis direction received by the power receiving part 111, and fz represents the pressing fore in the z-axis direction received by the power receiving part 111. The calculation shown in Expression (1) can be achieved by hardware or software including an analog circuit or a digital circuit, or both of them. For example, the calculation circuit that performs calculation shown in Expression (1) may be included in the substrate (gripping part 91) or may be achieved by an external microcomputer or the like. The force sensor may be integrated with the semiconductor substrate. By integrating the force sensor with the semiconductor substrate, the arithmetic function can be included, and the size of the sensor system can further be reduced. It can also be expected that the S/N will be improved.

As described above, the force sensor 11 includes the power receiving part 111 that follows in the z-axis direction, about the x axis, and about the y axis in accordance with an external force. Further, the force sensor 11 outputs the external force received by the power receiving part 111 as pressing forces (fx, fy, fz) in the three-axis direction.

Note that the aforementioned structure of the force sensor 11 shows one example of the sensor, and a specific structure thereof is not limited thereto. For example, the number of seesaw parts connected to the power receiving part 111 may be three, not four.

The details of the force sensors 11 have been described above. By arranging a plurality of forces sensors 11 that output the external force received by the power receiving part 111 as the pressing forces (fx, fy, fz) in the three-axis direction, the sensor system 10 is able to detect the pressing forces in the three-axis direction that the gripping part 91 receive from the object and the moment about the axis orthogonal to the reference plane 91A.

Figure 7:
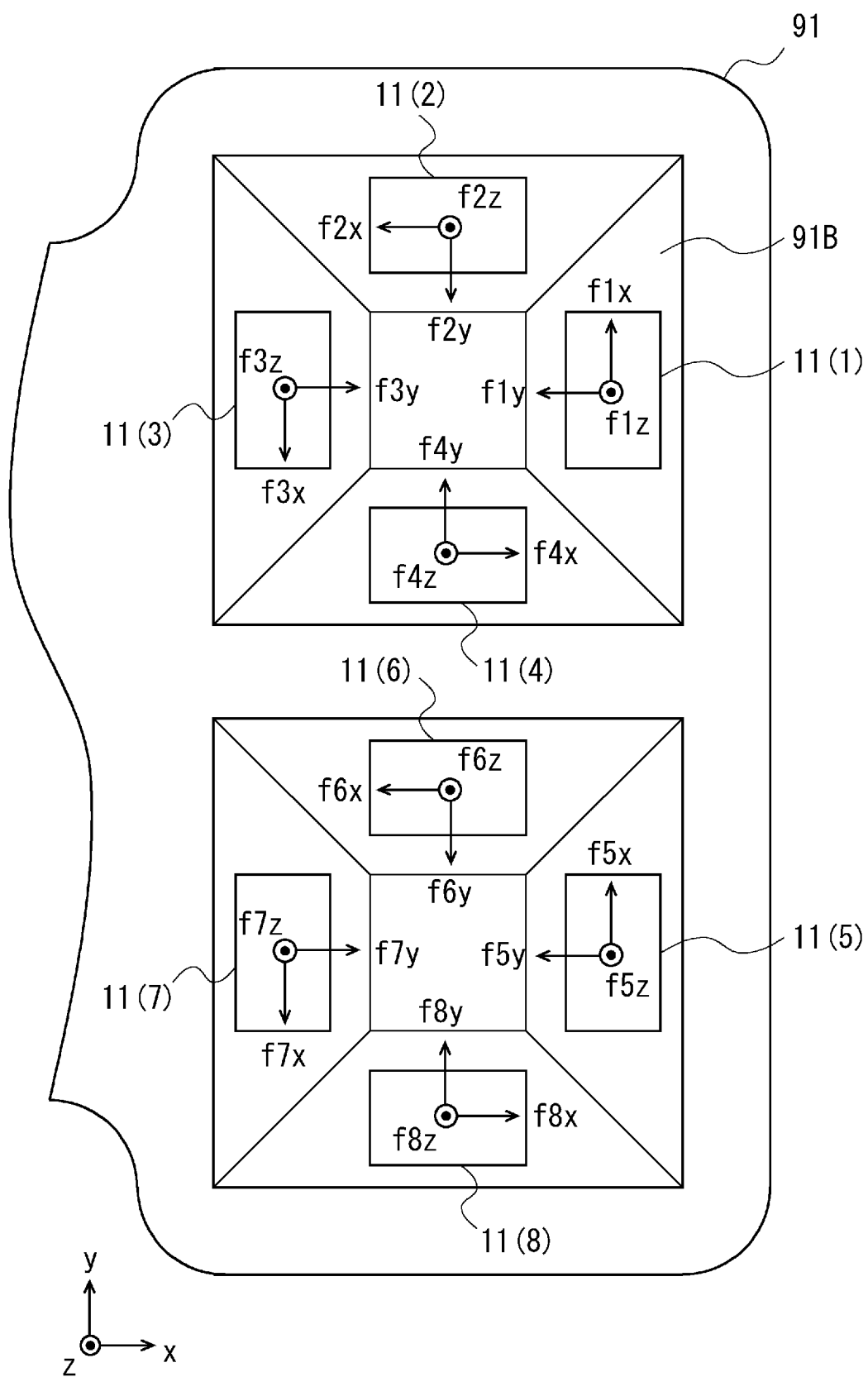
FIG. 7 is a diagram showing outputs of force sensors according to the first embodiment.

Referring next to FIG. 7, outputs of the force sensors 11(1)-11(8) arranged in the gripping part 91 will be explained. FIG. 7 is a diagram showing the outputs of the force sensors according to the first embodiment. FIG. 7 shows the pressing forces of the force sensors 11(1)-11(8) when the xy plane is observed from the z-axis positive side.

The directions of the arrows shown as the pressing forces match the positive directions of the pressing forces. Further, for the sake of facilitating understanding, the arrows of the pressing forces that are close to the direction in the z axis of the pressing forces shown in FIG. 7 are shown in such a way that they match the z-axis direction.

The force sensor 11(1) outputs pressing forces (f1x, f1y, f1z). Of the pressing forces (f1x, f1y, f1z), the pressing force f1z which is vertical to the inclined surface 91B, which is a placement surface, is set in the direction that is along the z axis of the rectangular coordinates, and more accurately, in the direction from the center of a quadrangular pyramid frustum toward the outside. Next, of the pressing forces in the two-axis direction parallel to the inclined surface 91B, the pressing force f1y is set in the direction toward the center of the quadrangular pyramid frustum. Lastly, the pressing force f1x is set in such a way that the pressing force of the force sensor 11(1) matches the positional relation of the right-handed rectangular coordinates. That is, the pressing force f1x of the force sensor 11(1) is set in the direction the same as the y-axis positive direction of the rectangular coordinates.

The force sensor 11(2) outputs pressing forces (f2x, f2y, f2z). Of these pressing forces, the pressing force f2z is set in the direction along the z axis of the rectangular coordinates. Next, the pressing force f2y is set in the direction toward the center of a quadrangular pyramid frustum. Lastly, the pressing force f2x is set in the direction the same as the x-axis negative direction of the rectangular coordinates in such a way that the pressing force of the force sensor 11(1) matches the positional relation of the right-handed rectangular coordinates.

The directions of the pressing forces of the force sensors 11(3)-11(8) are set in a way similar to those of the force sensors 11(1) and 11(2) described above. That is, the pressing force fz (f1z-f8z) of the force sensor 11 is set in the direction along the z axis of the rectangular coordinates, and more accurately, in the direction from the center of the quadrangular pyramid frustum toward the outside. Of the pressing forces in the two-axis direction parallel to the inclined surface 91B, the pressing force fy (f1y-f8y) is set in the direction toward the center of the quadrangular pyramid frustum. Lastly, the pressing force fx (f1x-f8x) is set in such a way that the pressing force of the force sensor 11(1) matches the positional relation of the right-handed rectangular coordinates. That is, the pressing force f1x and the pressing force f5x are set in the direction the same as the y-axis positive direction of the rectangular coordinates. The pressing force f2x and the pressing force f6x are set in the direction the same as the x-axis negative direction of the rectangular coordinates. The pressing force f3x and the pressing force f7x are set in the direction the same as the y-axis negative direction of the rectangular coordinates. Then the pressing force f4x and the pressing force f8x are set in the direction the same as the x-axis positive direction of the rectangular coordinates.

Figure 8:
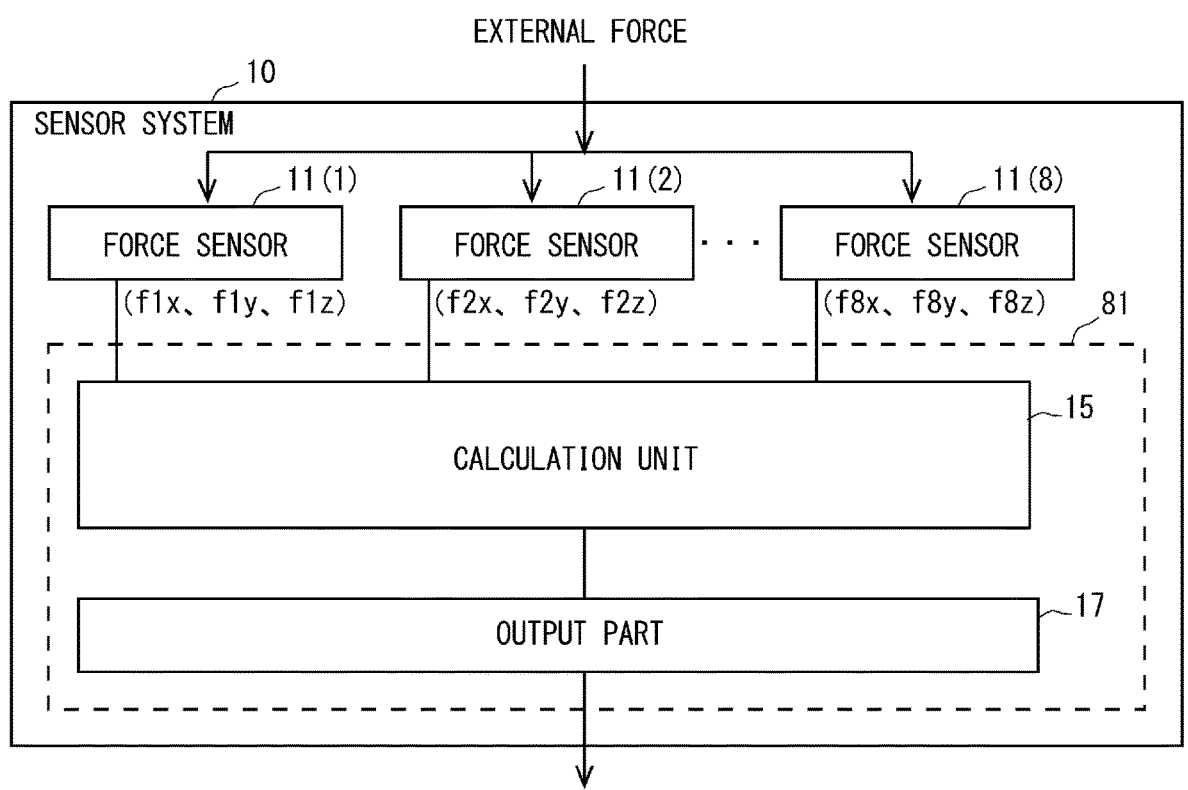
FIG. 8 is a functional block diagram of a sensor system according to the embodiment.

Referring next to FIG. 8, functional structures of the sensor system 10 will be explained. FIG. 8 is a functional block diagram of the sensor system according to the embodiment. The sensor system 10 shown in FIG. 8 is composed of eight force sensors 11(1)-11(8) and a signal processing unit 81. The eight force sensors 11 are eight force sensors 11(1)-11(8) provided in the gripping part 91 of the aforementioned first finger part 9R.

Upon receiving an external force, the force sensors 11 each output the pressing forces (fx, fy, fz). In the example shown in FIG. 8, the force sensor 11(1) outputs pressing forces (f1x, f1y, f1z). The force sensor 11(2) outputs pressing forces (f2x, f2y, f2z). In a similar way, the force sensor 11(8) outputs pressing forces (f8x, f8y, f8z). The force sensor 11 supplies the respective outputs to the signal processing unit 81.

The signal processing unit 81 mainly includes a calculation unit 15 and an output part 17. The calculation unit 15 is a calculation apparatus including a CPU mounted on the substrate. The calculation unit 15 receives the outputs from the force sensors 11 and calculates, from the received outputs, pressing forces and moments that the gripping part 91 receive from the object.

As described above, the eight force sensors 11 according to this embodiment are arranged in the inclined surfaces 91B, which are side surfaces of the quadrangular pyramid frusta formed on the reference plane. Therefore, the calculation unit 15 performs calculation for converting the outputs of the force sensors 11 arranged in the inclined surfaces having a preset angle with respect to the reference plane 91A into pressing forces and moments that are along the coordinate axis of the rectangular coordinates that correspond to the reference plane 91A.

At this time, the calculation unit 15 performs calculation in accordance with the directions in which the force sensors 11 are arranged and the angle that the inclined surfaces 91B where the force sensors 11 are arranged and the reference plane 91A form. Since the plurality of force sensors 11 are arranged on the inclined surfaces that are not parallel to each other, the sensor system 10 is able to detect the pressing forces and the moments in accordance with the arrangement of the force sensors 11. The calculation unit 15 supplies the results of the calculation to the output part 17.

The output part 17 is an interface part for externally outputting predetermined signals. The interface part is, for example, a connector mounted on the substrate. The output part 17 receives the results of the calculation from the calculation unit 15 and outputs the results of the reception to the outside of the signal processing unit 81. The output part 17 is not limited to a wired connector and may be a radio communication interface. The signal processing unit 81 may receive, besides the signals of the force sensors 11(1)-11(8) included in the first finger part 9R, outputs of the plurality of forces sensors 11 included in the second finger part 9L.

Figure 9:
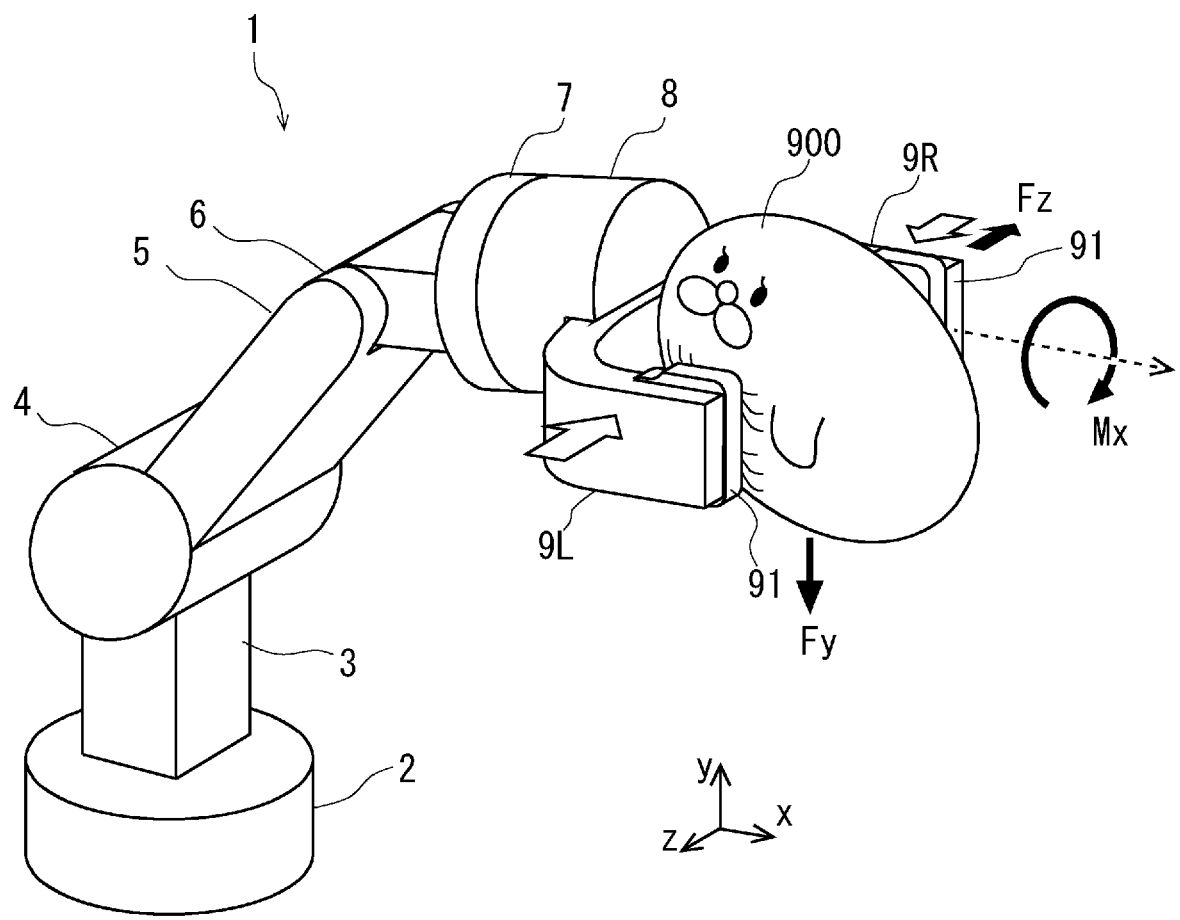
FIG. 9 is an external perspective view showing a state in which a robot hand grips an object.

Next, calculation performed by the calculation unit 15 will be explained with some specific examples. FIG. 9 is an external perspective view showing a state in which the robot hand grips an object. In FIG. 9, the robot hand 1 grips a spherical object 900. The object 900 is composed of a material that includes an elastic body such as a sponge or rubber. Therefore, the gripping part of the robot hand 1 grips the object 900 while compressing the surface of the object 900. At this time, the first finger part 9R receives a pressing force Fz as a reaction force in the z-axis direction in which the object 900 is gripped. Further, the first finger part 9R receives the pressing force Fy in the y-axis direction by the dead weight of the object 900. Moreover, the first finger part 9R receives a moment Mx about the x axis. In this situation, the sensor system 10 included in the robot hand 1 outputs pressing forces Fx, Fy, and Fz that are along the axes of the rectangular coordinates that the first finger part 9R receives from the object 900, and also outputs moments Mx, My, and Mz about the axis of the rectangular coordinates.

Figure 10:
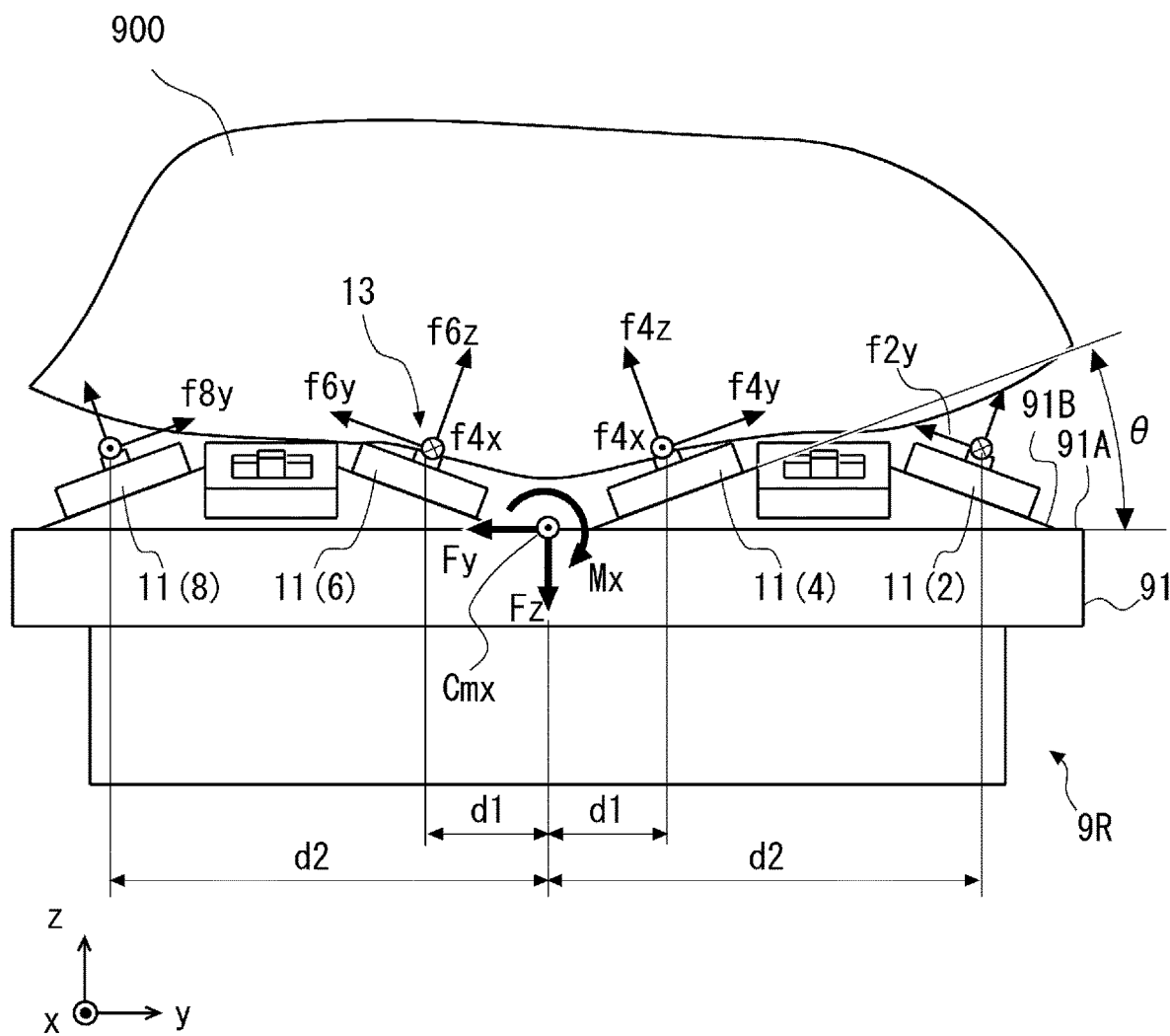
FIG. 10 is a diagram showing one example of a state of a gripping part that grips the object.

Referring next to FIG. 10, a state of the pressing forces and the moments in the gripping part 91 will be explained. FIG. 10 is a diagram showing one example of the state of the gripping part that grips the object. FIG. 10 shows the first finger part 9R of the robot hand 1 that grips the object 900 along the yz plane. As described above, the gripping part 91 of the first finger part 9R receives the pressing force Fz, the pressing force Fy, and the moment Mx. In the gripping part 91, the force sensor 11(4) and the force sensor 11(6) abut the object 900. Based on this situation, the calculation performed by the calculation unit 15 will be explained.

The calculation unit 15 calculates the pressing forces Fx, Fy, and Fz received by the gripping part 91. That is, the calculation unit 15 extracts the components that are parallel to the x axis of the rectangular coordinates from the outputs of the force sensors 11(1)-11(8), and calculates the total amount of outputs of the force sensors 11 that have been extracted. At this time, the calculation unit 15 does not include, for example, pressing forces that are orthogonal to the x axis such as the pressing force f1y of the force sensor 11(1) or the pressing forces f2y and f2z of the force sensor 11(2) in the calculation. In the example shown in FIG. 10, the pressing force Fx is zero.

Further, the calculation unit 15 calculates the pressing force Fy. That is, the calculation unit 15 extracts the components that are parallel to the y axis of the rectangular coordinates from the outputs of the force sensors 11(1)-11(8), and calculates the total amount of the outputs of the force sensors 11 that have been extracted. In the example shown in FIG. 10, the pressing force Fy is calculated by the total amount of the components in the y-axis direction of pressing forces f4y and f4z of the force sensor 11(4) and pressing forces f6y and f6z of the force sensor 11(6).

Further, the calculation unit 15 calculates the pressing force Fz. The pressing force Fz is obtained by the total sum of the components in the z-axis direction of all the force sensors 11. In the example shown in FIG. 10, the pressing force Fz is calculated by the total sum of the components in the y-axis direction of the pressing forces f4y and f4z of the force sensor 11(4) and the pressing forces f6y and f6z of the force sensor 11(6).

Next, calculation of the moment performed by the calculation unit 15 will be explained. The moment Mx received by the gripping part 91 is, for example, a force that is rotated around a center Cmx of the gripping part 91 in a clockwise direction as a positive direction. In this embodiment, the moment Mx can be obtained from the following Expression (2).

$$Mx = (f6y - f4y) \cdot \sin\theta \cdot d1 + (f8y - f2y) \cdot \sin\theta \cdot d2 \quad (2)$$

In the above Expression, d1 denotes a distance in the y-axis direction from the center Cmx to the force sensor 11(4) and a distance in the y-axis direction from the center Cmx to the force sensor 11(6). Further, d2 denotes a distance in the y-axis direction from the center Cmx to the force sensor 11(2) and a distance in the y-axis direction from the center Cmx to the force sensor 11(8). Further, θ denotes an angle that the reference plane 91A and the inclined surface 91B form. In the example shown in FIG. 10, the moment Mx can be obtained by calculating the first term of the right side of Expression (2). It is when a friction occurs between the surface of the abutting part 13 of the force sensor 11 and the object 900 that the pressing force fy occurs when the object 900 is gripped as shown in FIG. 10.

The calculation unit 15 further calculates the moment My. The moment My can be obtained from the distance from the rotation center of the gripping part 91 to each of the force sensors 11 (the distance in the x-axis direction), the pressing force fy of the force sensor 11, and the angle θ, similar to the calculation of the moment Mx described above. In the example shown in FIG. 10, the moment My is zero.

As described above, in the sensor system 10, the gripping part 91 includes the inclined surfaces 91B and the force sensors 11 are provided on the respective inclined surfaces 91B. Then the calculation unit 15 extracts, from the pressing forces parallel to the inclined surfaces 91B, the components vertical to the reference plane 91A, and calculates the moment Mx and the moment My from the pressing forces of the extracted components and the rotation center of the gripping part 91.

The calculation unit 15 further calculates the moment Mz. The calculation unit 15 extracts, from the outputs of the force sensors 11, the components parallel to the xy plane, and calculates the total sum of the value obtained by multiplying the extracted components by the rotation center. The method of calculating the moment Mz has already been performed by one skilled in the art. Therefore, it is not described in detail.

While the first embodiment has been described above, the structure of the first embodiment is not limited to the aforementioned one. The quadrangular pyramid frustum formed on the reference plane 91A may either be a triangular pyramid frustum or a truncated pyramid having a bottom surface which is a pentagon or a polygon that has six or more sides and angles. Further, the number of convex parts formed by the above truncated pyramids may be any number equal to one or larger.

According to the aforementioned first embodiment, it is possible to provide a six-axis sensor system and the like that can achieve downsizing and thinning and that corresponds to a desired area.

Second Embodiment

Figure 11:
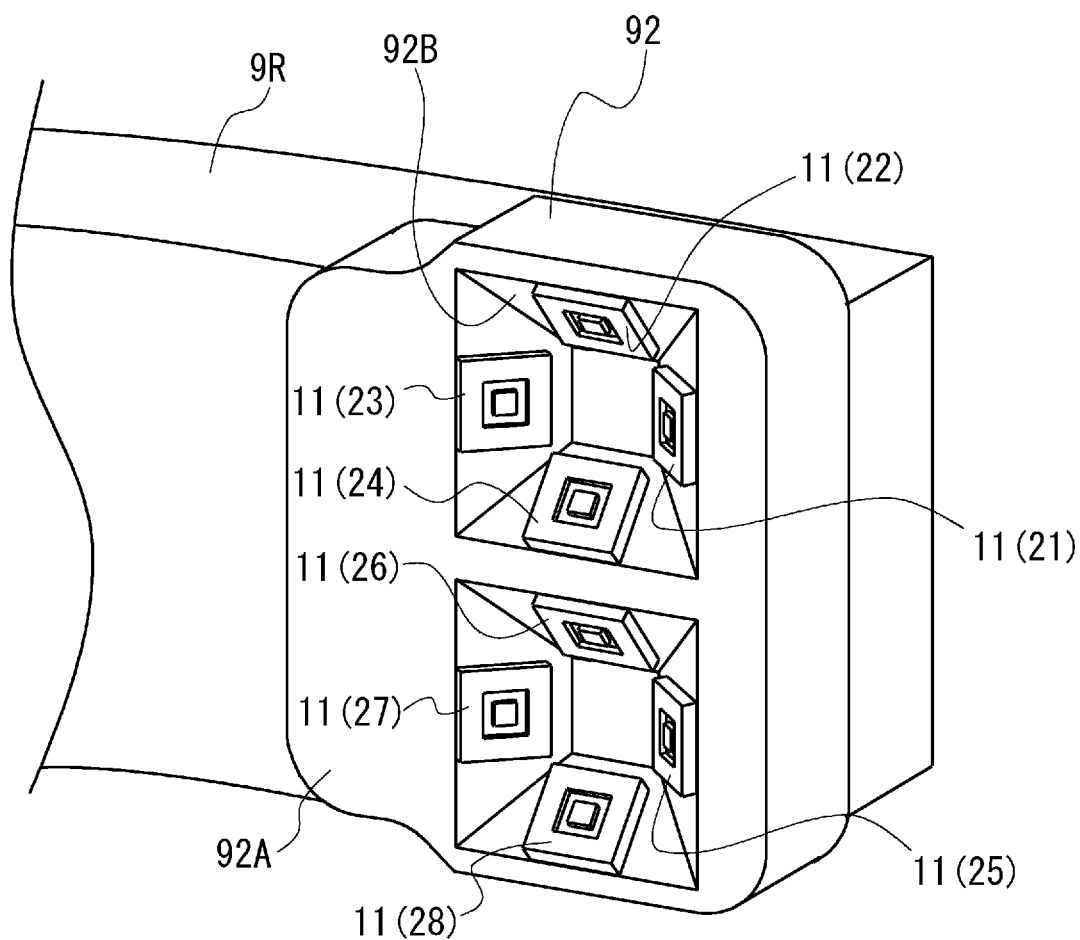
FIG. 11 is a diagram showing a structure of a gripping part of a robot hand according to a second embodiment.

Referring next to FIG. 11, a second embodiment will be explained. FIG. 11 is a diagram showing a configuration of a gripping part of a robot hand according to the second embodiment. A gripping part 92 according to the second embodiment shown in FIG. 11 is different from the gripping part 91 according to the first embodiment in that the gripping part 92 according to the second embodiment includes concave parts in place of the convex parts.

The gripping part 92 includes a reference plane 92A on a side of the gripping part 92 that grips the object. Further, two concave parts having a reverse quadrangular pyramid frustum shape are formed along the y axis on the reference plane 92A. The respective sides formed by the rectangle of the bottom surface part of the reverse quadrangular pyramid frustum are each along the x axis or the y axis. Inclined surfaces 92B, which are side surfaces of the reverse quadrangular pyramid frustum, are formed in such a way that they each form a predetermined angle with respect to the reference plane 92A.

The force sensor 11 is provided on each of the inclined surfaces 92B. That is, the force sensors 11 are provided on the respective inclined surfaces included in the two convex parts having a quadrangular pyramid frustum shape. Therefore, the gripping part 92 includes eight force sensors 11. That is, the reference plane 92A includes the plurality of inclined surfaces 92B having lines of intersection different from one another with respect to the reference plane 92A, and the force sensor 11 is arranged in each of the plurality of inclined surfaces 92B.

In the example shown in FIG. 11, the eight force sensors are shown with the symbols of the force sensor 11(21) to the force sensor 11(28). It is the force sensor 11(21) that is arranged on the inclined surface 92B on the x-axis positive side of the reverse quadrangular pyramid frustum on the y-axis positive side in FIG. 11, and the force sensors 11(22), 11(23), and 11(24) are arranged in a counterclockwise direction. In the reverse quadrangular pyramid frustum on the y-axis negative side in FIG. 11 as well, it is the force sensor 11(25) that is arranged on the inclined surface 92B on the x-axis positive side, and the force sensors 11(26), 11(27), and 11(28) are arranged in a counterclockwise direction.

The force sensors 11(21)-11(24) are arranged on the respective side surfaces of one reverse quadrangular pyramid frustum. Therefore, the force sensors 11(21)-11(24) are arranged on planes that form preset angles with respect to the reference plane 92A and that are not parallel to one another. Note that the force sensor 11(21) and the force sensor 11(25) are arranged to be parallel to each other. In a similar way, the force sensor 11(22) and the force sensor 11(26), the force sensor 11(23) and the force sensor 11(27), and the force sensor 11(24) and the force sensor 11(28) are arranged to be parallel to each other.

According to the aforementioned second embodiment, it is possible to provide a six-axis sensor system and the like that can achieve downsizing and thinning and that correspond to a desired area.

Note that the present disclosure is not limited to the above embodiments and may be changed as appropriate without departing from the spirit of the present disclosure. The gripping part may include, for example, both the convex part illustrated in the first embodiment and the concave part illustrated in the second embodiment.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A sensor system comprising:
   a substrate including a reference plane and an inclined surface that is inclined at a predetermined angle with respect to the reference plane;
   a force sensor that is provided on the inclined surface and outputs signals in three-axis directions that correspond to an orthogonal axis direction that is orthogonal to the inclined surface and two-axis directions that are parallel to the reference plane in accordance with an external force from an object received by a power receiving part;
   a calculation unit configured to calculate, based on the signals that the force sensor outputs, a pressing force in each coordinate axis direction of rectangular coordinates formed of an axis vertical to the reference plane and two axes parallel to the reference plane and moments around the respective coordinate axes of the rectangular coordinates; and
   an output part configured to output calculation results, which are results of the calculation.

2. The sensor system according to claim 1, wherein the force sensor is a capacitive type sensor.

3. The sensor system according to claim 1, wherein
   the reference plane includes a plurality of inclined surfaces having lines of intersection different from one another with respect to the reference plane, and
   the force sensor is arranged in each of the plurality of inclined surfaces.

4. The sensor system according to claim 3, wherein the inclined surface that the reference plane includes is a side surface of a convex part having a truncated pyramid shape, the reference plane serving as a bottom surface.

5. The sensor system according to claim 4, wherein the inclined surface that the reference plane includes is a side surface of a convex part having a quadrangular pyramid frustum shape, the reference plane serving as a bottom surface.

6. The sensor system according to claim 1, wherein the inclined surface that the reference plane includes is a side surface of a concave part having a reverse truncated pyramid shape, the reference plane serving as a top surface.

7. The sensor system according to claim 1, wherein the calculation unit extracts a component in a direction that is vertical to the reference plane from a pressing force in a direction that is parallel to the inclined surface of the output of the force sensor, and calculates the moment from the extracted component and a rotation center of the substrate.

8. A robot hand comprising:
   the sensor system according to claim 1;
   a plurality of gripping parts that grip an object; and
   a driving part that causes the plurality of gripping parts to approach in such a way that they are opposed to each other,
   wherein the gripping part includes the substrate and a plurality of force sensors of the sensor system.

* * * * *